March 15, 1938.   R. F. NORRIS   2,111,326
ACOUSTICAL TREATMENT OF WALLS
Filed Dec. 6, 1935     2 Sheets-Sheet 1
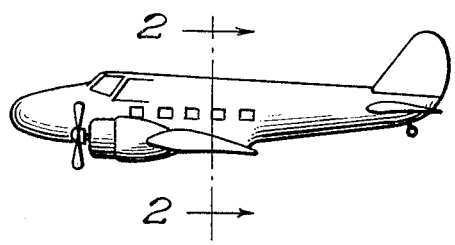
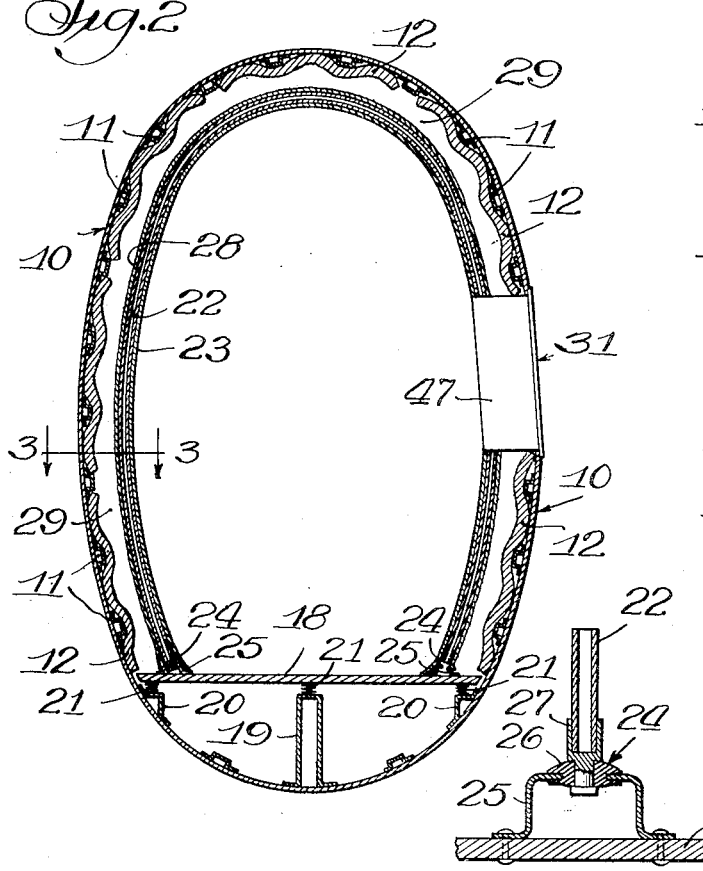
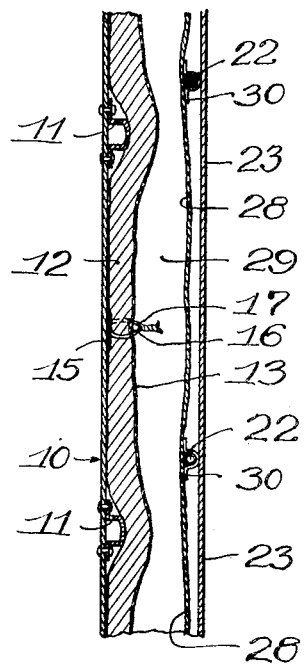
Witness:
Chas. R. Koursh.
Inventor,
Ralph Forbush Norris
Dyrenforth, Lee, Chritton & Wiles, Attys.

March 15, 1938. R. F. NORRIS 2,111,326
ACOUSTICAL TREATMENT OF WALLS
Filed Dec. 6, 1935  2 Sheets-Sheet 2
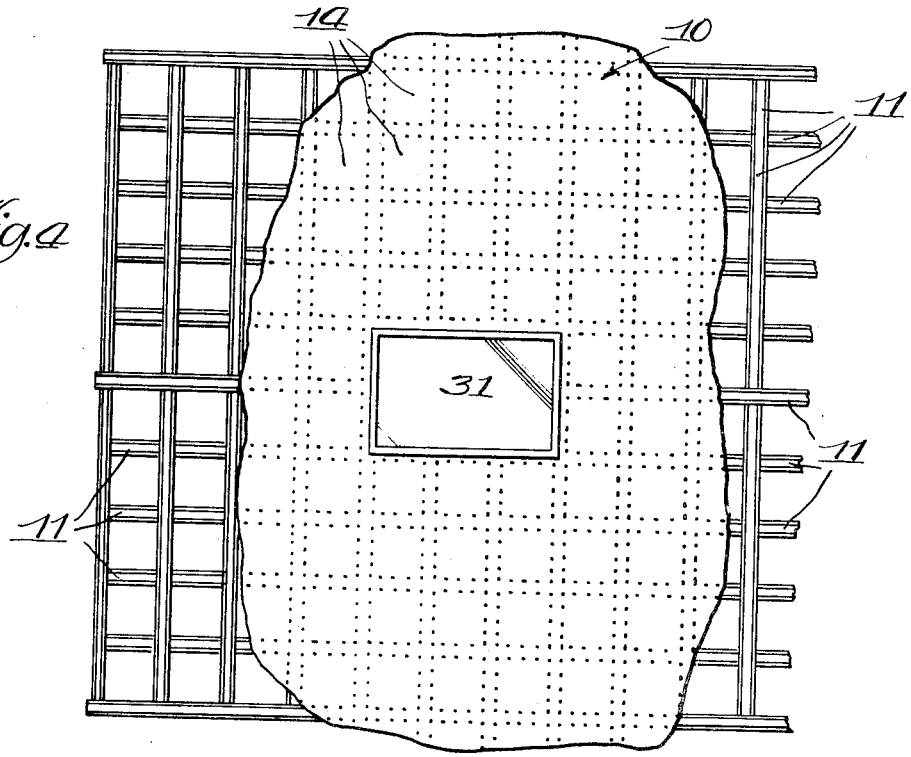
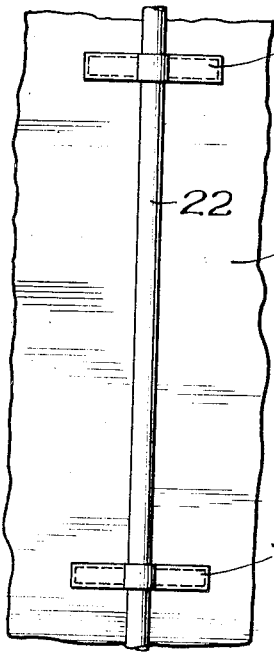
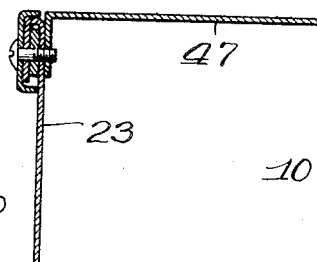
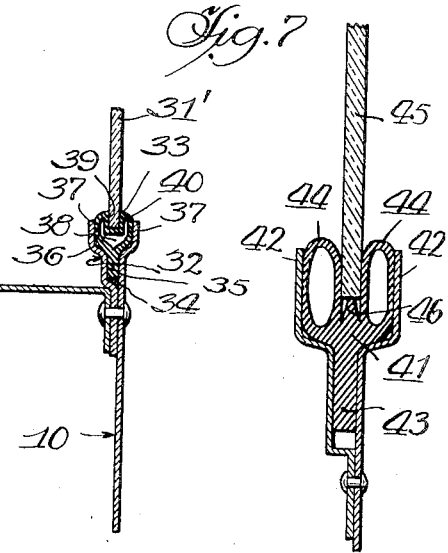

Patented Mar. 15, 1938

2,111,326

UNITED STATES PATENT OFFICE 2,111,326

ACOUSTICAL TREATMENT OF WALLS

Ralph Forbush Norris, Madison, Wis., assignor to C. F. Burgess Laboratories, Inc., Chicago, Ill., a corporation of Delaware Application December 6, 1935, Serial No. 53,277

18 Claims. (Cl. 20—4)

This invention relates to the acoustical treatment of walls which are subjected to sound vibrations and other vibrations, and is particularly applicable as a sound deadening construction for airplane cabins, although it is not limited to such use. The framework of an airplane is subjected to the mechanical vibrations created by the operating mechanism and the enclosing wall or skin is subjected to the surrounding noises and other pressure variations, caused by the rush of air past the plane, the engine exhaust, the pulses in the wake of the propeller blades, the rapid changes in barometric conditions, etc. The wall is usually composed of thin metal which responds to these mechanical vibrations and noises and is inherently of such character as to transmit them readily to the interior of the cabin.

One object of the invention is to provide an acoustical treatment for preventing sounds on one side of such a wall from being transmitted to the region immediately adjacent the opposite side of the wall.

It is a further object of this invention to provide a treatment for airplane cabins which reduces the intensity of the usual noises and vibrations within the cabin and renders them unobjectionable.

Another object is to improve the acoustics with respect to sounds originating within an airplane cabin, so as to minimize interference with conversation therein and permit the same to be carried on in ordinary tones.

It is an additional object of the invention to provide a vibration-dampening window mounting for airplane cabins.

Other objects and advantages will become apparent from the following description, which is to be considered in conjunction with the accompanying drawings wherein a commercial embodiment of the invention is illustrated.

Fig. 1 is a side elevation of an airplane equipped with my sound deadening construction;

Fig. 2 is a transverse section on the line 2—2 of Fig. 1;

Fig. 3 is an enlarged fragmental view along line 3—3 of Fig. 2;

Fig. 4 is a fragmental view of the cabin framework and exterior wall;

Fig. 5 is a fragmental view of an interior wall member and its supporting means;

Fig. 6 is an enlarged sectional view of one form of the window supporting means of this invention;

Fig. 7 is a similar view of a modified form; and

Fig. 8 is an enlarged section of a bow supporting bracket.

The chief features of the cabin treatment comprise a lining of soft porous material attached to the inner surface of the outer wall or skin of the airplane, in such a manner as to dampen the vibrations of the wall, and a substantially non-vibratory, air and sound-impervious partition, spaced interiorly from the said lining to entrap any sounds or vibrations which may be transmitted to it from the exterior wall. It is to be understood that the terms "interior" and "exterior" are not used in a limiting sense in the specification and claims, but merely to denote directions toward and away from, respectively, the space it is desired to quiet.

The exterior wall or skin 10 of the airplane is composed of thin, light-weight sheet metal fastened by riveting or welding to rigid frame members or ribs 11. The wall material may be in the form of large sheets supported upon widely spaced frame members, but is usually supported upon more closely spaced members, forming a plurality of relatively small panels as shown in Fig. 4. In accordance with this invention, a relatively thick layer of soft, porous material 12 is attached to the interior surface of wall 10, forming an inner lining therefor. This material may be of any soft, porous composition in which the pores communicate with the surface of said lining which is disposed toward the interior of the cabin. Pads of matted hair, or of fibers of wood, such as are marketed under the trade name Balsam-Wool, or of kapok, cotton, etc., are suitable for the purpose. The lining is preferably of low density. Balsam-Wool pads of one-inch thickness and weighing 0.15 to 0.30 pound per square foot give satisfactory results. Since the tensile strength of such material usually is low, it may be reenforced and confined by an open mesh woven fabric such as cheesecloth, as indicated at 13 in Fig. 3. It is essential that the lining be fastened to or held against the wall 10 in such a manner that the vibrations of said wall are impressed positively upon the lining as a whole and not upon the adjacent surface portion only as might be the case if the lining were merely cemented to the wall. For this purpose fastening means are furnished which cause pressure against the interior surface of said lining, as for example a holding device which extends through the lining, as hereinafter described. Such fastening means are provided preferably at the approximate centers of the small panels 14, of which the wall may be considered to be composed. See Fig. 4. In effecting such fastening, a quantity of cloth fabric 15 may be cemented locally to the wall 10 and a cord or wire 16 stitched through the fabric and through the porous lining 12, and the ends drawn together tightly and fastened together. A section of rod 17, or a plate, washer, or other form of retaining means may be positioned against the interior surface of layer 12 and the cord or wire fastened over the same. The porous lining 12 may be stretched rather tightly so as to be put under tension between the points where it rests against frame members 11 and where it is fastened to wall 10, and it may be pressed against the interior surface of wall 10 throughout a substantial portion of the area of each panel 14. Under some conditions the lining may be cemented to the surface of wall 10, in addition to being fastened thereto as above described.

The cabin floor is supported on flexible mountings to prevent the vibration of the frame work of the plane from being transmitted to said floor. As shown in Fig. 2, the floor 18 is of a width a little less than the distance between the outer walls at that point. In other words, a clearance is provided to prevent transmission of vibrations. Said floor may be mounted on the lower frame member 19 and side members 20 with interposed flexible supports 21 which may consist of rubber, springs or other suitable flexible material. In accordance with this invention a plurality of bows or curved strips 22, which may be made of light metal, are yieldingly mounted on the airplane structure, preferably on the floor 18, independently of and spaced inwardly from the side walls to provide a clearance space, and shaped to form a supporting framework for the interior cabin lining 23. Said bows, as shown in Fig. 8, may be mounted upon flexible supports 24 which comprise a bracket 25 fastened to the floor, a flexible rubber disc 26 carried by said bracket, and a socket 27 for the bow, carried by said rubber disc, and having no direct contact with said bracket. Such flexible supports reduce the transmission of vibrations from the framework to the interior lining 23. In the usual construction, said lining is merely fastened to the inner sides of the frame members 11. Further in accordance with this invention, a flexible, substantially solid sheet or membrane 28 is mounted loosely and in non-vibratory manner upon the outer sides of bows 22 and out of contact with the porous lining 12, leaving a clearance space 29 between the two. Any flexible material which is substantially non-pervious to the passage of sound or air therethrough may be used. By this is meant that it is substantially impossible for the sound to pass through, or to be transferred from the air on one side of it to the air on the other side of it except by means of vibrations set up in the membrane. Suitable materials are rubber or rubberized fabric, oil or paint-treated fabric, moisture-proof regenerated cellulose and other film materials, etc. Ordinary oilcloth is suitable. The membrane 28 need not necessarily be thin but may be of any desired thickness provided that it is flexible and limp, and the term "membrane" in the specification and claims is not limited to mean a thin membrane. It may be fastened to bows 22 at distributed points by any suitable means, an example of which is illustrated in Fig. 5 which shows strips of strong fabric 30 partially encircling said bows at intervals along the length thereof and sewed to membrane 28. Said membrane is fastened with substantially no tension between supports 30, and the only tension there is upon it is that due to the weight of the various areas or sections thereof which are supported by the corresponding supports 30.

The decorative lining 23 of the cabin is supported upon the inner sides of bows 22. This lining may be of wood, fibre-board or other composition but is usually of a decorative textile fabric material such as is commonly used for the interior lining of automobiles. The means for supporting said lining may be similar to that described in connection with membrane 28 as illustrated in Fig. 5. The material of lining 23 should be drawn taut between supports. For the purposes of this invention, lining 23 is of sound-absorbing character, preferably having a moderate sound-absorbing efficiency; being capable, for instance, of absorbing from 10 to 25 percent of the sound incident thereon. The decorative textile fabric materials referred to above possess sound-absorbing power within this range.

The acoustical and other vibratory action which takes place in the treated airplane is substantially as follows: The engine, although it may be supported upon flexible mountings, imparts vibrations to the framework 11 of the airplane and through this to the walls 10 and floor 18 of the cabin. The sounds and the other pressure variations of the air adjacent the exterior of the airplane, especially those due to the "wash" of the propellers are also impressed upon wall 10. The sections or panels 14 of this wall act as diaphragms and respond to such vibratory action and amplify the same at certain frequencies dependent upon the size and other characteristics of the panels. Unless these vibrations are reduced in some way, they are transmitted to the interior of the cabin as noises and disturbing air-throbs.

The flexible floor mountings reduce the transmission of vibrations from the framework to the floor. Floor coverings, such as rugs and rug pads may reduce such vibrations further and also reduce the effects thereof on the occupants of the cabin. Porous lining 12 is an inert weight which exerts a blanketing action upon wall 10 and dampers the vibratory motion of the same. It is also an efficient sound-absorbing medium for absorbing sounds transmitted to the space 29, particularly those sounds of the higher frequencies, by which is meant, in general, frequencies above five hundred double vibrations per second. In addition, porous lining 12 reduces the acoustical and mechanical coupling between the inner surface of wall 10 and the air adjacent thereto, with the result that the vibrations of the wall are transmitted only ineffectually to the air. The air, instead of being contacted directly by, or driven by the solid surface of the wall, is driven by the porous surface of lining 12 which communicates with the porous interior thereof, and the air moves into and out of the pores. The efficiency of such driving action is obviously very low, which is a desirable feature. In addition, the tension between the points where lining 12 passes over frame members 11 and where it is attached to wall 10 tends to restrain the individual vibratory motion of panels 14.

The ties 16 bind wall 10 and lining 12 together firmly at the many distributed points and the vibrations of the wall are impressed positively upon the lining at these points. Thus the two vibrate together substantially as a unit. Said ties are placed at the centers of the panels 14 because the amplitude of the vibratory motion is greatest at these points. The maximum effectiveness of the lining as a vibration dampener and silencing means is thus realized. Although the lining is effective at all frequencies, it is particularly so at the higher frequencies, and the sounds and other vibrations which pass through to the adjacent interior space 29 comprise largely those of relatively lower frequencies. If wall 10 and the exterior surface of lining 12 are united by an adhesive without the employment of ties 16, the motion of the attached surface portion of lining 12 is greater than that of the portions further removed from wall 10, because of the loose fibrous character of such materials. This results in reduced sound and vibration dampening action and may also result in physical separation of the material of lining 12 with use.

The vibrations which pass into the space 29 and which are predominantly of the lower frequencies are substantially absorbed or stopped by the substantially non-pervious and non-vibratory membrane 28. Since the vibrations cannot pass through this membrane, they are not transferred to the cabin interior by means of propagation by the air, and since the flexible membrane is supported in such a manner that there is substantially no tension between supports, as described heretofore, it is non-vibrant, that is, vibrations are not impressed upon it to any substantial degree, and it does not transmit the vibrations to the adjacent interior space by means of its own vibratory motion. Such a limp, tensionless, flexible, non-pervious membrane is an effective stop for vibrations over a wide range of frequencies, including the low frequencies which are not stopped by the lining 12. Thus the combination of lining 12 and membrane 28 provides an effective stop for the entire range of frequencies encountered in airplane silencing. It has been found that as the tension upon the membrane 28 is increased, it becomes increasingly effective in transmitting low frequency vibrations and also it becomes more and more responsive to higher frequencies.

The interior wall 23 of the cabin is designed to have a moderate sound-absorbing effect, primarily to quiet the noises originating within the cabin. It also absorbs extraneous sounds which reach it through the construction described heretofore. Since the space is small and other sound-absorbing bodies are usually present, such as rugs, upholstered chairs, clothing, etc., a highly efficient sound-absorbing material usually is not desirable, since this may so over-deaden the cabin as to render it uncomfortable for the occupants and reduce the audible range of the voice.

Even with the above described acoustical treatment, a disturbing proportion of noises and other vibrations may be transmitted to the cabin interior unless the cabin windows 31 are provided with vibration dampening mountings. The relatively heavy glass windows may cause the sections of wall 10 surrounding them to act as diaphragms weighted at the centers and may cause an actual increase in the vibratory action of walls 10 unless cushioning mountings are provided. A mounting which has been found to be effective is illustrated in Fig. 6. A bracket 32 is attached to wall 10 along the edges of the window opening. Although it is immaterial whether the bracket is located on the outside or inside of the wall 10, for purposes of description it is positioned on the inner side. The bracket and the wall edge are shaped to form a clamp and a channel for the flexible, preferably soft rubber, glass supporting strip or seat 33. The narrow clamping space 34 receives the projecting edge 35 of said rubber seat and the wider channel space 36 between the outwardly flared marginal portions 37 of the wall and bracket receives the hollow, substantially tubular portion 38 thereof. The supporting strip as a whole is secured by means of the clamping engagement described and the hollow enlarged portion is not cemented or otherwise attached to the channel walls 37. The outwardly opening slot 39 receives the edge of window pane 31', which may be cemented in place. Similar construction may be employed at all edges of the window. The window casing 47 is clamped against bracket 32 and holds in position the edge portions of the interior lining 23 which surround the window opening.

The window mounting described is an effective vibration dampening means because of the great flexibility of the thin walls of the hollow portion 38. Inward movement of wall 10 causes a compressive force upon exterior wall portion 40 of the rubber mounting, which is transmitted to the glass panel weakly at first but more strongly as exterior channel portion 37 approaches the same. In this way a soft cushioning effect is obtained, and a similar effect is obtained upon outward movement of wall 10. Furthermore, before any substantial motion is imparted to the glass in one direction, the wall has reversed its direction and the movement of the glass in the first direction is stopped. Since the wall vibrations are usually of small magnitude most of them occur while the glass panel is in the position where the mounting strip possesses maximum flexibility.

A modification of the flexible window mounting is shown in Fig. 7 and comprises a soft rubber strip or seat 41 mounted between channel sides 42 with a narrow marginal portion 43 clamped between the sides of the narrower portion of the channel, as before. The strip or member 41 comprises two hollow portions 44 between which is a slot adapted to receive the edge of window panes 45. At the base of said slot, there is a projecting portion or rib 46 on the strip 41. The marginal portion of the window pane is cemented to the side walls of the slot, but the edge of the pane is not cemented to projecting rib 46, the latter serving only to space the edge of the window pane from the base of the slot. In this construction the hollow portions 44 serve as soft cushions for the window pane, the operation being similar to that of the mounting shown in Fig. 6.

It is to be understood that the invention is not necessarily limited to the details disclosed as many variations may be made. For instance, bows 22 may be mounted upon the lower frame members 11 instead of upon the floor, and there may be bracing members between bows 22. Other structural details may be changed, or parts supplied, or different applications made of the acoustical features, without departing from the spirit of the invention.

Certain subject matter herein relating to the vibration dampening supports for the window panes, has been covered in a divisional application, Serial No. 68,308, filed March 11, 1936, and issued April 27, 1937, as Patent No. 2,078,731.

I claim:

1. A construction for excluding extraneous sounds and vibrations from a space having a thin wall inherently capable of free vibration, comprising a thick layer of soft, porous, flexible material attached to the interior surface of said wall, and a second wall in spaced interior relation to said layer of porous material, said second wall being of substantially sound-impervious, non-vibratory character.

2. A construction for excluding extraneous sounds and vibrations from a space having a thin wall inherently capable of free vibration, comprising a thick layer of soft, porous, flexible material lining said wall, means for transmitting the vibrations of said wall to said layer, and a second wall comprising a limp, substantially sound-impervious, non-vibratory membrane mounted in spaced interior relation to said layer of porous material.

3. A construction for excluding extraneous sounds and vibrations from a space having a sound and vibration transmitting wall, comprising a thick layer of soft, flexible, low density material lining the interior surface of said wall, means attached to said wall, passing through said layer and engaging the interior surface of said layer for insuring the positive transmission of the vibrations of said wall to said layer, and a flexible, substantially sound-impervious membrane in spaced relation to said layer, said membrane being supported substantially without tension other than that due to its weight.

4. A construction for excluding extraneous sounds and vibrations from a space having a sound and vibration transmitting wall, comprising a layer of soft, flexible, openly porous material lining the interior surface of said wall, the pores of said material communicating with the interior surface of said material, means fastened to said wall at distributed points upon the area of said wall, passing through said layer and engaging the interior surface of said layer, for attaching said layer to said wall and positively transmitting the vibrations of said wall to said layer, and a flexible, substantially sound-impervious membrane in spaced relation to said layer, said membrane being supported independently of said wall and substantially without tension other than that due to its weight.

5. A construction for a space having a wall subdivided into a plurality of thin, sound and vibration transmitting sections, comprising a layer of soft, porous, low-density material lining the interior side of said wall, attaching means fastened to said wall substantially at the centers of said sections and extending through said layer and engaging the interior surface of said layer, the pores of said material communicating with the interior surface of said layer, and a flexible, substantially sound-impervious membrane mounted in spaced interior relation to said layer, said membrane being supported independently of said wall and substantially without tension other than that due to its weight.

6. In combination, a thin panel inherently capable of free vibration, and a relatively thick layer of soft, porous, flexible material in substantially contiguous relation to said panel, means fastened to approximately the center of said panel and passing through said layer and locally engaging the surface of said layer remote from said panel for firmly fixing said layer to the central portion of said panel.

7. In combination, a thin wall inherently capable of free vibration, said wall being made up of a plurality of panels capable of individual vibration supplementing the vibration of the wall as a whole, and a relatively thick layer of soft, porous, flexible material lining said wall, means fastened to said wall at approximately the centers of said panels and passing through said layer and locally engaging the surface of said layer remote from said wall for firmly fixing said layer to said wall at said points.

8. A construction for silencing airplane cabins having thin, sound and vibration transmitting walls, comprising a relatively thick layer of soft, porous, flexible material attached to the interior surface of said walls in a manner such that the vibrations of said walls are transmitted to said layer, the pores of said lining communicating with the interior surface thereof, furring strips spaced interiorly from said layer, flexible mountings for said furring strips, a flexible, substantially sound-impervious membrane mounted substantially without tension upon said furring strips and spaced from said layer.

9. A construction for silencing airplane cabins having thin, sound and vibration transmitting cabin walls, comprising a relatively thick layer of soft, flexible, openly porous material lining the interior surfaces of said walls, means fixed to said walls at distributed points upon the area of said walls, passing through said layer, and locally engaging the interior surface of said layer, for attaching said layer to said walls and positively transmitting the vibrations of said walls to said layer, furring strips spaced interiorly from said layer, flexible mountings for said furring strips, a flexible, substantially sound-impervious membrane mounted substantially without tension upon said furring strips and spaced interiorly from said layer, and a decorative interior lining for said cabin, said lining being mounted upon said furring strips and being of sound-absorbing construction.

10. In combination, an airplane cabin framework, a thin, sound and vibration transmitting wall upon said framework, a relatively thick layer of soft, flexible, low density sound-absorbing material fastened interiorly to said wall in a manner such that the vibrations of said wall are transmitted to said layer, and a substantially sound-impervious, limp, non-vibratory membrane mounted upon said framework, said membrane being spaced interiorly from said layer.

11. In combination, a cabin framework, a thin, sound and vibration transmitting wall upon said framework, a relatively thick layer of soft, porous, flexible material fastened interiorly to said wall in a manner such that the vibrations of said wall are transmitted to said layer, furring strips mounted upon said framework, flexible supports for said furring strips, and a flexible, substantially sound-impervious membrane mounted substantially without tension upon said furring strips and spaced interiorly from said layer.

12. In combination, an airplane cabin framework, a thin, sound and vibration transmitting wall upon said framework, a relatively thick layer of soft, porous, flexible material fastened to said wall upon the interior side of said wall in such a manner that the vibrations of said wall are transmitted to said layer, furring strips mounted upon said framework, flexible supports for said furring strips, a flexible, substantially sound-impervious membrane mounted substantially without tension upon said furring strips and spaced interiorly from said layer, and a decorative cabin lining mounted upon said furring strips and spaced interiorly from said membrane.

13. In combination, an airplane cabin framework, a thin, sound and vibration transmitting wall upon said framework, a relatively thick layer of soft, porous, flexible material lining the interior surface of said wall, means fixed to said wall at distributed points upon the area of said wall, said means passing through said layer and engaging locally the surface of said layer remote from said wall for fastening said layer to said wall and positively transmitting the vibrations of said wall to said layer, furring strips mounted upon said framework, flexible supports for said furring strips, a flexible, substantially sound-impervious membrane mounted substantially without tension upon said furring strips and spaced interiorly from said layer, a decorative cabin lining of sound-absorbing material, mounted upon said furring strips and spaced interiorly from said membrane, flexible floor mountings supported upon said framework, and a cabin floor mounted upon said flexible mountings.

14. In an airplane cabin, the combination of a thin, sound and vibration transmitting wall and a flexible, substantially sound-impervious membrane in spaced, interior, substantially parallel relation to said wall, said membrane being mounted upon vibration absorbing mountings and having a plurality of supports at distributed points upon its area, said membrane being supported substantially without tension other than that due to the weight of the sections thereof supported by each of said supports.

15. In an airplane cabin, the combination of a thin, sound and vibration transmitting wall and a flexible, limp, substantially sound-impervious membrane in spaced, interior relation to said wall, said membrane being loosely mounted so as to be substantially non-vibrant.

16. In an acoustical treatment for enclosures subjected to noise and vibration from without and having a thin wall inherently capable of free vibration, a relatively thick layer of flexible, porous material lining the surface of said wall, means fastened locally to said wall at points distributed over the area thereof, passing through said layer, and engaging the surface of said layer remote from said wall for holding said layer against said wall.

17. An acoustical treatment for enclosures subjected to noise and vibration from without, comprising a layer of porous material held against the wall of said enclosure at substantially regularly spaced areas, a partition within said enclosure yieldingly supported by part of said wall but out of direct contact therewith, a frame yieldingly supported by said partition and adjacent the wall of said enclosure but out of contact therewith, and a limp membrane of sound-impervious material covering said frame, forming with said porous layer a double walled inner lining for said enclosure, and providing a dead air space.

18. In an acoustical treatment for enclosures subjected to noise and vibration from without, and having a thin wall inherently capable of free vibration, a relatively thick layer of flexible, porous material positioned against said wall, means for pressing said material against said wall to cause it to partake of the vibrations of said wall, and a flexible, limp, substantially sound-impervious membrane in spaced interior relation to said wall, said membrane being loosely mounted so as to be substantially non-vibrant.

RALPH FORBUSH NORRIS.